United States Patent
Xue et al.

(10) Patent No.: US 9,448,370 B2
(45) Date of Patent: Sep. 20, 2016

(54) CONNECTOR AND CONNECTOR ASSEMBLY

(71) Applicants: Tyco Electronics (Shanghai) Co. Ltd., Shanghai (CN); Tyco Electronics Corporation, Berwyn, PA (US)

(72) Inventors: Hawk Xue, Shanghai (CN); Soren Grinderslev, Hummelstown, PA (US); Zhaoyang Tong, Shanghai (CN); Lily Liu, Shanghai (CN)

(73) Assignees: COMMSCOPE TECHNOLOGIES LLC, Hickory, NC (US); ADC Telecommunications (Shanghai) Distribution Co., Ltd. (CN)

( * ) Notice: Subject to any disclaimer, the term of this patent is extended or adjusted under 35 U.S.C. 154(b) by 2 days.

(21) Appl. No.: 14/379,909

(22) PCT Filed: Feb. 19, 2013

(86) PCT No.: PCT/IB2013/051329
§ 371 (c)(1),
(2) Date: Aug. 20, 2014

(87) PCT Pub. No.: WO2013/124785
PCT Pub. Date: Aug. 29, 2013

(65) Prior Publication Data
US 2016/0018606 A1 Jan. 21, 2016

(30) Foreign Application Priority Data
Feb. 20, 2012 (CN) .......................... 2012 1 0037495

(51) Int. Cl.
*G02B 6/36* (2006.01)
*G02B 6/38* (2006.01)
(Continued)

(52) U.S. Cl.
CPC ............. *G02B 6/3893* (2013.01); *G02B 6/38* (2013.01); *G02B 6/3817* (2013.01);
(Continued)

(58) Field of Classification Search
CPC G02B 6/3893; G02B 6/3821; G02B 6/3825; G02B 6/3879; H01R 13/502
USPC ................................................ 385/53, 76–78
See application file for complete search history.

(56) References Cited

U.S. PATENT DOCUMENTS 5,011,424 A 4/1991 Simmons
5,090,916 A 2/1992 Magnier
(Continued)

FOREIGN PATENT DOCUMENTS

CN 1658441 A 8/2005
CN 101160696 A 4/2008
(Continued)

OTHER PUBLICATIONS

WO 2009/135387 a PCT pub date Nov. 12, 2009 inventor Peterhans, parent of U.S. Pat. No. 8,221,007.*
International Search Report for International Application No. PCT/IB2013/051329 mailed Jun. 13, 2013 (2 pages).
International Search Report for International Application No. PCT/IB2013/051329 mailed Jun. 13, 2013 (7 pages).
International Search Report for International Application No. PCT/EP2012/052039 mailed May 31, 2012. (3 pages).
(Continued)

*Primary Examiner* — Ryan Lepisto
*Assistant Examiner* — Guy Anderson
(74) *Attorney, Agent, or Firm* — Merchant & Gould P.C.

(57) ABSTRACT

A connector for coupling with an adapter, comprising: at least one connector body each having a first end capable of being inserted into the adapter; at least one locking mechanism; and a boot movably engaged with the connector body. Each of the at least one locking mechanism comprising: a slanting arm extending slantingly and upwardly from the respective connector body; at least one locking protrusion configured to extend from sides of the slanting arm to lock the connector body into locking grooves of the adapter; and a driving arm having a first end connected to the slanting arm. Wherein a second end of the driving arm is connected to the boot and is movable together with the boot to drive the slanting arm connected with the first end of the driving arm to approach a horizontal direction. When an angle between the slanting arm and the horizontal direction becomes smaller than a predetermined angle, the locking protrusion starts to be separated from the locking groove of the adapter, so that an interlock between the connector body and the adapter is unlocked.

16 Claims, 12 Drawing Sheets

(51) Int. Cl.
*H01R 13/627* (2006.01)
*H01R 13/633* (2006.01)
*H01R 31/06* (2006.01)
*H01R 13/502* (2006.01)
*H01R 24/64* (2011.01)

(52) U.S. Cl.
CPC ......... *G02B 6/3821* (2013.01); *G02B 6/3825* (2013.01); *G02B 6/3879* (2013.01); *H01R 13/502* (2013.01); *H01R 13/6272* (2013.01); *H01R 13/633* (2013.01); *H01R 31/06* (2013.01); *H01R 24/64* (2013.01)

(56) References Cited

U.S. PATENT DOCUMENTS

| | | | |
|---|---|---|---|
| 5,123,071 A | 6/1992 | Mulholland et al. | |
| 5,211,572 A | 5/1993 | Comstock et al. | |
| 5,315,679 A | 5/1994 | Baldwin et al. | |
| 5,335,301 A | 8/1994 | Newman et al. | |
| 5,462,457 A * | 10/1995 | Schroepfer | H01R 13/5845 |
| | | | 439/344 |
| 5,481,634 A | 1/1996 | Anderson et al. | |
| 5,574,812 A | 11/1996 | Beier et al. | |
| 5,579,425 A | 11/1996 | Lampert et al. | |
| 5,638,474 A | 6/1997 | Lampert et al. | |
| 5,675,682 A | 10/1997 | De Marchi | |
| 6,024,498 A | 2/2000 | Carlisle et al. | |
| 6,076,974 A | 6/2000 | Carlisle et al. | |
| 6,196,733 B1 | 3/2001 | Wild | |
| 6,250,817 B1 | 6/2001 | Lampert et al. | |
| 6,250,942 B1 | 6/2001 | Lemke et al. | |
| 6,254,418 B1 | 7/2001 | Tharp et al. | |
| 6,276,839 B1 | 8/2001 | De Marchi | |
| 6,325,547 B1 | 12/2001 | Cammons | |
| 6,357,934 B1 | 3/2002 | Driscoll | |
| 6,435,732 B1 | 8/2002 | Asao | |
| 6,443,627 B1 * | 9/2002 | Anderson | G02B 6/3825 |
| | | | 385/56 |
| 6,447,170 B1 | 9/2002 | Takahashi et al. | |
| 6,692,289 B2 | 2/2004 | Nemoto | |
| 6,776,645 B2 | 8/2004 | Roth et al. | |
| 6,863,556 B2 | 3/2005 | Viklund et al. | |
| 6,994,580 B1 | 2/2006 | Chen | |
| 7,037,129 B2 | 5/2006 | Lo et al. | |
| 7,052,186 B1 * | 5/2006 | Bates | G02B 6/3893 |
| | | | 385/139 |
| 7,101,212 B1 | 9/2006 | Larkin | |
| 7,163,414 B2 | 1/2007 | Lo et al. | |
| 7,281,938 B1 | 10/2007 | Wu | |
| 7,297,013 B2 | 11/2007 | Caveney et al. | |
| 7,326,075 B1 | 2/2008 | Armstrong et al. | |
| 7,329,137 B2 | 2/2008 | Martin et al. | |
| 7,354,292 B1 | 4/2008 | Lloyd et al. | |
| 7,413,473 B2 | 8/2008 | Wu | |
| 7,421,181 B2 | 9/2008 | Kanou et al. | |
| 7,425,159 B2 | 9/2008 | Lin | |
| 7,440,670 B2 | 10/2008 | Kanou et al. | |
| 7,445,484 B2 | 11/2008 | Wu | |
| 7,465,180 B2 * | 12/2008 | Kusuda | H01R 13/6272 |
| | | | 439/344 |
| 7,534,125 B1 | 5/2009 | Schroll | |
| 7,534,128 B2 | 5/2009 | Caveney et al. | |
| 7,588,373 B1 | 9/2009 | Sato et al. | |
| 7,594,766 B1 | 9/2009 | Sasser et al. | |
| 7,632,125 B2 | 12/2009 | Irwin et al. | |
| 7,641,398 B2 | 1/2010 | O'Riorden et al. | |
| 7,651,361 B2 | 1/2010 | Henry et al. | |
| 7,666,023 B2 | 2/2010 | Wu | |
| 7,690,939 B2 | 4/2010 | Wu | |
| 7,736,171 B2 | 6/2010 | Reed et al. | |
| 7,753,710 B2 | 7/2010 | George | |
| 7,771,225 B1 | 8/2010 | Wu | |
| 8,152,384 B2 * | 4/2012 | de Jong | G02B 6/3893 |
| | | | 385/53 |
| 8,152,385 B2 | 4/2012 | de Jong et al. | |
| 8,187,018 B2 | 5/2012 | Kosugi | |
| 8,221,007 B2 * | 7/2012 | Peterhans | G02B 6/3893 |
| | | | 385/53 |
| 8,235,745 B1 | 8/2012 | Armstrong et al. | |
| 8,317,532 B2 | 11/2012 | Kosugi | |
| 8,382,506 B2 | 2/2013 | Reed et al. | |
| 8,465,317 B2 | 6/2013 | Gniadek et al. | |
| 8,690,593 B2 * | 4/2014 | Anderson | G02B 6/3825 |
| | | | 439/326 |
| 8,764,308 B2 | 7/2014 | Irwin et al. | |
| 8,864,390 B2 * | 10/2014 | Chen | G02B 6/387 |
| | | | 385/60 |
| 8,870,466 B2 * | 10/2014 | Lu | G02B 6/3807 |
| | | | 385/139 |
| 8,876,403 B2 * | 11/2014 | Katoh | G02B 6/3831 |
| | | | 385/55 |
| 2002/0090177 A1 * | 7/2002 | Anderson | G02B 6/3825 |
| | | | 385/60 |
| 2003/0220008 A1 | 11/2003 | Viklund et al. | |
| 2003/0220080 A1 | 11/2003 | Chuberre et al. | |
| 2003/0220081 A1 | 11/2003 | Dykstra et al. | |
| 2003/0220082 A1 | 11/2003 | Yoshida | |
| 2003/0220083 A1 | 11/2003 | Lee et al. | |
| 2003/0220084 A1 | 11/2003 | Makarov | |
| 2003/0220085 A1 | 11/2003 | Kawand | |
| 2003/0220086 A1 | 11/2003 | Birkett | |
| 2003/0220087 A1 | 11/2003 | Suhonen | |
| 2003/0220088 A1 | 11/2003 | Cowley et al. | |
| 2003/0220089 A1 | 11/2003 | Change et al. | |
| 2003/0222008 A1 | 12/2003 | Nightlinger et al. | |
| 2004/0247252 A1 | 12/2004 | Ehrenreigh | |
| 2005/0054230 A1 | 3/2005 | Huang | |
| 2005/0058404 A1 | 3/2005 | Ngo | |
| 2005/0124201 A1 | 6/2005 | Lo et al. | |
| 2006/0049826 A1 | 3/2006 | Daneman et al. | |
| 2006/0089039 A1 | 4/2006 | Caveney | |
| 2007/0049082 A1 | 3/2007 | Wu | |
| 2007/0077806 A1 | 4/2007 | Martin et al. | |
| 2007/0140621 A1 * | 6/2007 | DeCusatis | G02B 6/3887 |
| | | | 385/53 |
| 2007/0232118 A1 | 10/2007 | Wu | |
| 2007/0298636 A1 | 12/2007 | Kusuda et al. | |
| 2008/0030220 A1 | 2/2008 | Agarwal et al. | |
| 2008/0226237 A1 | 9/2008 | O'Riorden et al. | |
| 2009/0042424 A1 | 2/2009 | Kaneda | |
| 2009/0047818 A1 | 2/2009 | Irwin et al. | |
| 2009/0245732 A1 | 10/2009 | Murano | |
| 2010/0216325 A1 | 8/2010 | Huang | |
| 2010/0220961 A1 | 9/2010 | De Jong et al. | |
| 2011/0058773 A1 * | 3/2011 | Peterhans | G02B 6/3893 |
| | | | 385/76 |
| 2011/0081113 A1 | 4/2011 | Jones | |
| 2011/0091159 A1 | 4/2011 | De Jong et al. | |
| 2011/0183541 A1 | 7/2011 | Kosugi | |
| 2011/0217008 A1 * | 9/2011 | Cline | G02B 6/3869 |
| | | | 385/78 |
| 2011/0299814 A1 | 12/2011 | Nakagawa | |
| 2012/0057826 A1 * | 3/2012 | Katoh | G02B 6/3887 |
| | | | 385/78 |
| 2012/0155810 A1 * | 6/2012 | Nakagawa | G02B 6/3879 |
| | | | 385/78 |
| 2012/0208388 A1 | 8/2012 | Kosugi | |
| 2012/0213478 A1 * | 8/2012 | Chen | G02B 6/387 |
| | | | 385/62 |
| 2013/0115794 A1 | 5/2013 | Chang et al. | |
| 2013/0301994 A1 * | 11/2013 | Motofuji | G02B 6/36 |
| | | | 385/78 |
| 2013/0323949 A1 | 12/2013 | De Dios Martin et al. | |
| 2014/0141641 A1 | 5/2014 | De Dios Martin et al. | |
| 2014/0169727 A1 | 6/2014 | Veatch et al. | |

FOREIGN PATENT DOCUMENTS

| | | |
|---|---|---|
| EP | 1 653 566 | 5/2006 |
| EP | 1 855 360 | 11/2007 |
| EP | 2063497 | 5/2009 |
| EP | 2144100 | 1/2010 |
| EP | 2 337 163 | 6/2011 |

(56) References Cited

FOREIGN PATENT DOCUMENTS

| | | |
|---|---|---|
| JP | S63-184271 | 7/1988 |
| JP | 2003526116 | 9/2003 |
| WO | WO 2004/065999 | 8/2004 |
| WO | WO 2006/047258 | 5/2006 |
| WO | WO 2007/044310 A1 | 4/2007 |
| WO | WO 2009/135787 | 11/2009 |
| WO | WO 2010/038283 | 8/2010 |
| WO | WO 2012/054174 | 8/2012 |
| WO | WO 2012/107439 | 8/2012 |
| WO | WO 2012/107441 | 8/2012 |
| WO | WO 2012/151175 | 11/2012 |
| WO | WO 2015/103783 | 7/2015 |

OTHER PUBLICATIONS

Spanish Search Report for corresponding application No. ES 201130169 mailed May 24, 2013 (with English Translation); 10 pages.

Spanish Search Report for application No. ES 201130168 mailed Jul. 1, 2013 (with English Translation); 8 pages.

International Search Report for International Application No. PCT/EP2012/052036 mailed Mar. 22, 2012. (2 pages).

Chinese Office Action dated Jun. 18, 2015; CN Patent Appln. No. 201280017445.X; 5 pages.

Chinese Office Action dated May 22, 2015; CN Patent Appln. No. 201280017489.2; 7 pages.

* cited by examiner

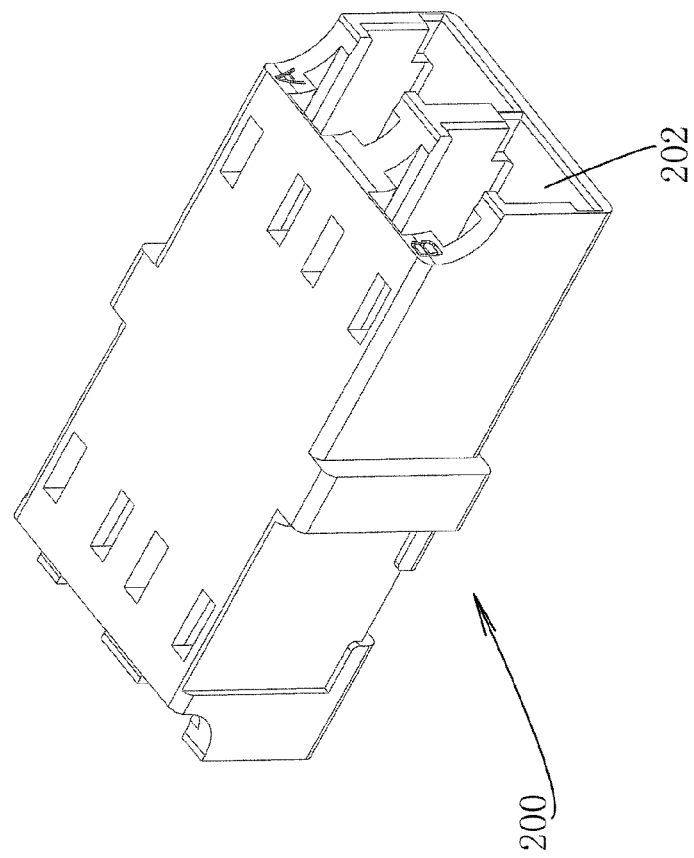
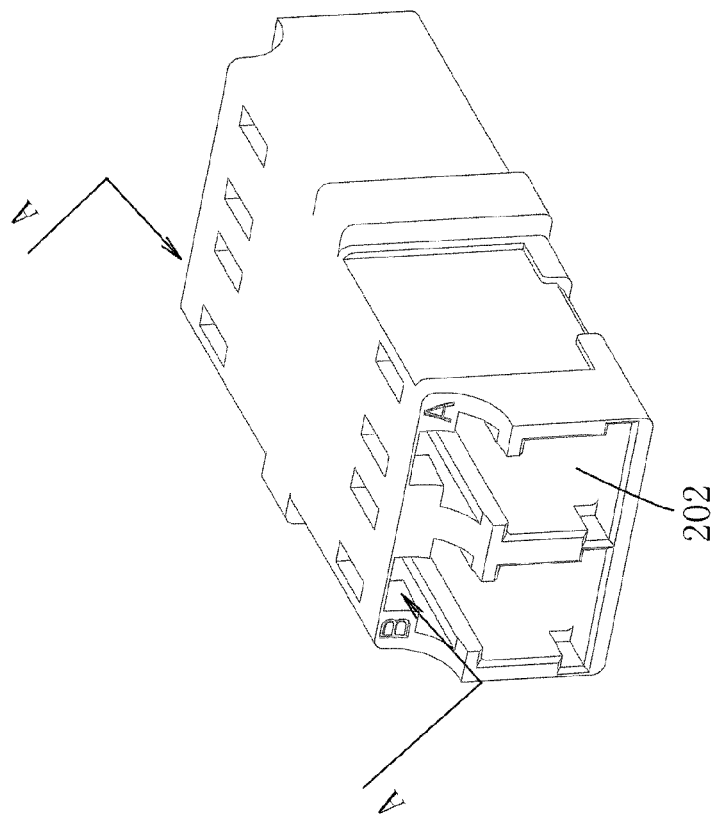
Fig. 4
Fig. 5

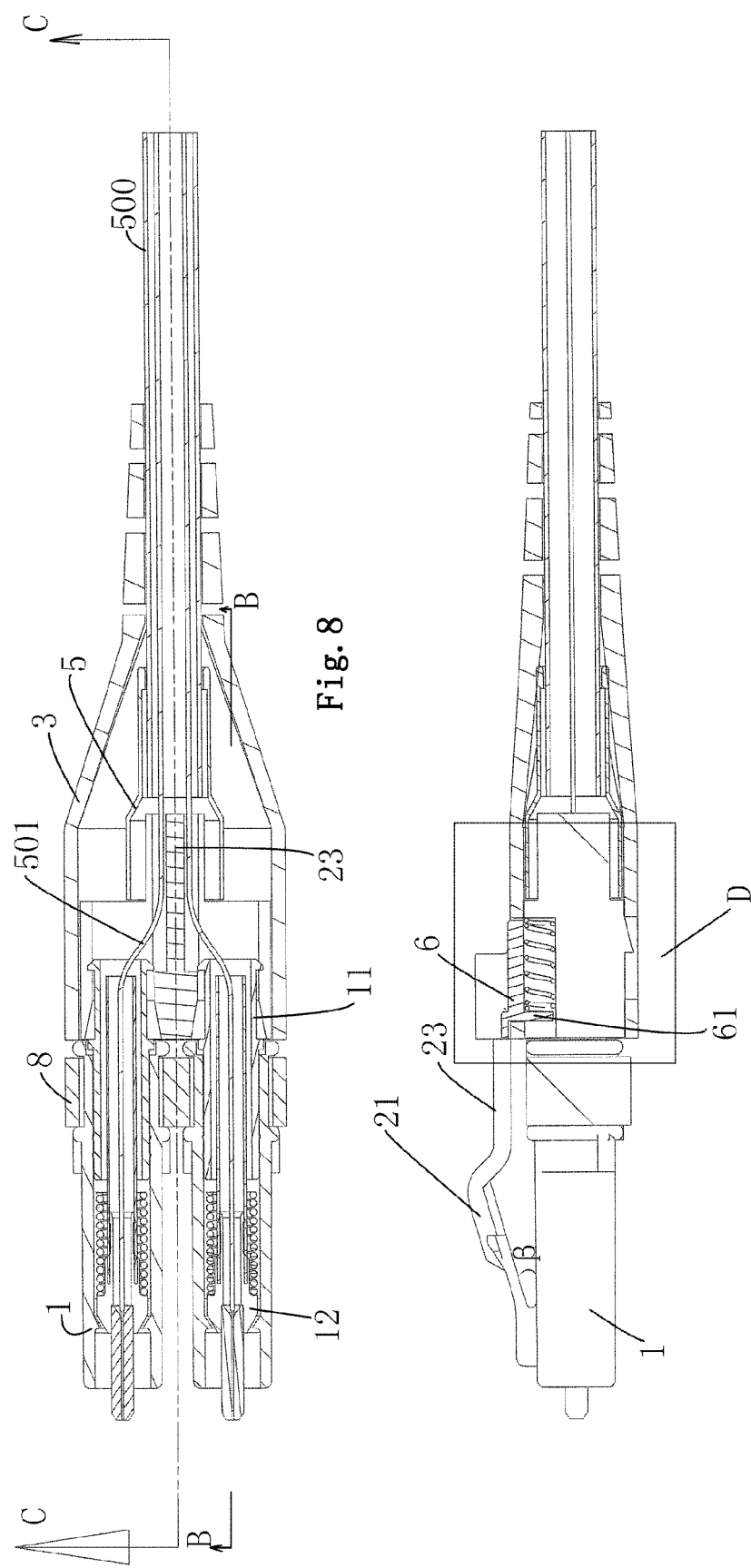

CONNECTOR AND CONNECTOR ASSEMBLY

CROSS-REFERENCE TO RELATED APPLICATION

This application is a National Stage Application of PCT/IB2013/051329, filed 19 Feb. 2013, which claims the benefit of Chinese Patent Application No. 201210037495.6 filed on Feb. 20, 2012 in the State Intellectual Property Office of China, and which applications are incorporated herein by reference. To the extent appropriate, a claim of priority is made to each of the above disclosed applications.

BACKGROUND OF THE INVENTION

1. Field of the Invention

The present invention relates to a connector used in the data communication and the telecommunication, more particularly, relates to a connector in which an elastic locking member is displaced to release an interlock between the connector and an adapter by moving a boot backward, and relates to a connector assembly having the connector.

2. Description of the Related Art

Generally, in various network communication terminals, such as a computer, a router, a server, an exchanger, etc, a user terminal is electrically coupled to an external cable by inserting a plug connector into a receptacle connector, for example, fixed in a wall. Particularly, in an optical fiber communication, it is necessary to use an fiber optic connector to couple, distribute or switch optical fibers.

FIG. 15 shows an illustrative perspective view of a conventional fiber optic connector 400 capable of coupling an optical cable 300 to an adapter 200 shown in FIGS. 4-6. The fiber optic connector 400 comprises a connector body 401 and a relief boot 402 fixed on one end of the connector body 401 to protect the optical cable 300. The optical cable 300 passes through the relief boot 402 and is inserted into the connector body 401. A ferrule 301 for the optical fiber of the optical cable 300 is exposed out of the other end of the connector body 401. The connector body 401 comprises a housing 403 and a locking mechanism fixed on the housing 403. The locking mechanism comprises an elastic slanting arm 404 extending from the housing 403 in a slope angle of a with respect to the housing 403 and locking protrusions 405 protruded from both sides of the slanting arm 404. Please refer to FIG. 6 and FIG. 16, the adapter 200 has a box-shape and comprises a receiving portion 202 for receiving the connector body 401 therein, a splicing portion for splicing the ferrule 301 for the optical fiber of the optical cable 300, and a locking groove 201 formed in a wall of the receiving portion 202. Referring to FIG. 15, when the fiber optic connector 400 is inserted into the adapter 200, the connector body 401 is received in the receiving portion 202, the ferrule 301 is inserted into the splicing portion 203 to splice with a ferrule of another optical fiber inserted in the splicing portion 203, the locking protrusions 405 is fitted in the locking grooves 201, and an end of the slanting arm 404 is exposed outside the adapter 200. In this way, the locking protrusions 405 are locked in the locking grooves 201 so that the whole fiber optic connector 400 cannot be directly pulled out of the adapter 200.

When it needs to separate the fiber optic connector 400 from the adapter 200, an operator presses the end of the slanting arm 404 of the locking mechanism so that the end of the slanting arm 404 moves toward the outside of the housing 403 to drive the locking protrusions 405 separate from the locking grooves 201 and then the fiber optic connector 400 can be pulled out of the adapter 200.

In the above fiber optic connector 400, a reliable interlock between the fiber optic connector 400 and the adapter 200 is achieved by the elastic locking member. If it needs to maintain, check or reconstruct the fiber optic connector 400, then an operator may press the slanting arm 404 from sides of the fiber optic connector 400 to release the interlock between the fiber optic connector 400 and the adapter 200. Accordingly, an enough operation space must be left in advance on an assemble panel (not shown) for mounting the adapter 200 to ensure that the operator can easily press the slanting arm 404. Thereby, the conventional fiber optic connector 400 needs occupying a relatively larger space, and a space between adjacent adapters 200 on the assemble panel cannot be reduced, as a result, the adapters 200 cannot be arranged on the assemble panel in a high density.

SUMMARY OF THE INVENTION

The present invention has been made to overcome or alleviate at least one aspect of the above mentioned disadvantages.

Accordingly, it is an object of the present invention to provide a connector, wherein an elastic locking member is shifted, by moving a boot backward, to release and separate an interlock between the connector and an adapter, so that the adapters can be arranged on an assemble panel in a high density without needing to leave a relatively larger operation space in advance.

According to an aspect of the present invention, there is provided a connector for coupling with an adapter, comprising: at least one connector body each having a first end capable of being inserted into the adapter; at least one locking mechanism; and a boot movably engaged with the connector body. Each of the at least one locking mechanism comprising: a slanting arm extending slantingly and upwardly from the respective connector body; at least one locking protrusion configured to extend from sides of the slanting arm to lock the connector body into locking grooves of the adapter; and a driving arm having a first end connected to the slanting arm. Wherein a second end of the driving arm is connected to the boot and is movable together with the boot to drive the slanting arm connected with the first end of the driving arm to approach a horizontal direction. When an angle between the slanting arm and the horizontal direction becomes smaller than a predetermined angle, the locking protrusion starts to be separated from the locking groove of the adapter, so that an interlock between the connector body and the adapter is unlocked.

The above connector further comprises an automatic restoration mechanism configured to restore the boot to an initial position after an external force exerted on the boot for moving it relative to the connector body disappears.

In the above connector, the automatic restoration mechanism comprises a spring configured to generate elastic deform with a movement of the boot relative to the connector body so as to produce a resilience force for restoring the boot to the initial position when the external force disappears.

The above connector further comprises an engagement device movably inserted into the boot, wherein a second end of the connector body opposite to the first end is inserted into the engagement device, the automatic restoration mechanism is mounted on the engagement device and generates elastic deform with a movement of the boot relative to the engagement device.

In the above connector, an elongated groove for receiving the spring therein is formed in an outside portion of the engagement device.

In the above connector, the second end of the driving arm is connected to the boot in a snap-in manner.

In the above connector, a first protuberance is provided on the second end of the driving arm, and a fixation portion for receiving the second end of the driving arm is provided on an outer portion of the boot and formed with a first elastic piece for fitting with the first protuberance.

In the above connector, a detachable cover is provided on the fixation portion and has a block arm extending downward and inserted into a front end of the spring received in the elongated groove of the engagement device so that the spring is abutted against the block arm.

In the above connector, the connector body comprises a connection portion extending from the second end of the connector body and inserted into the engagement device in a fastener or snap-in manner to prevent the connector body from being disengaged from the engagement device.

In the above connector, the connection portion is provided with a second protuberance radially extending outward, the engagement device is formed with a second elastic piece for fitting with the second protuberance, and the connector body and the engagement device are fixed together by a snap-in manner of the second protuberance and the second elastic piece.

The above connector further comprises a holding ring provided in the boot, a cable introduced in the boot passing through the holding ring, wherein the engagement device comprises an extension portion, and the holding ring can be slid to the extension portion over the cable.

In the above connector, a receiving groove for receiving a bared fiber of the cable is formed in the extension portion.

In the above connector, a secondary ring is provided between the extension portion and the holding ring.

In the above connector, the connector comprises two connector bodies, and a holding bracket is provided to hold the two connector bodies side by side.

In the above connector, the connector is a fiber optic connector.

In the above connector, the connector is a LC type of fiber optic connector.

According to another aspect of the present invention, there is provided a connector assembly comprising a connector according to the above embodiments and an adapter. The adapter comprising: at least two chambers in pairs formed in both ends of the adapter, respectively, and configured to receive the inserted connector bodies therein, respectively; at least two locking grooves formed in inner walls of the chambers, respectively, and configured to fit with the locking protrusions of the connector; and at least one splicing portion each disposed between a pair of chambers for coupling with an ferrule of the connector body inserted into the chambers.

According to another aspect of the present invention, there is provided a connector assembly comprising a connector according to the above embodiments and an adapter. The adapter comprising: at least one chamber formed in one end of the adapter and configured to receive the respective inserted connector body therein; at least one locking groove formed in an inner wall of the chamber and configured to fit with the locking protrusion of the connector; and at least one splicing portion each disposed in the respective chamber and provided with a fixation ferrule for coupling with an ferrule of the connector body inserted into the chamber.

According to various exemplary embodiments of the present invention, the interlock between the connector and an adapter can be released by directly moving boot relative to the connector body, therefore, the operator does not need to press the elastic slanting arm with fingers and then pull the connector out of the adapter. Furthermore, the automatic restoration mechanism can automatically restore the boot to the initial position after the external force exerted on the boot for moving it relative to the connector body disappears. Moreover, the connector of the present invention can greatly reduce the operation space for plugging and pulling the connector, as a result, a plurality of adapters and/or connectors can be arranged and mounted on the assemble panel in a higher density.

BRIEF DESCRIPTION OF THE DRAWINGS

The above and other features of the present invention will become more apparent by describing in detail exemplary embodiments thereof with reference to the accompanying drawings, in which:

FIG. 4 is an illustrative perspective view of an adapter of the connector assembly of FIG. 1 in a direction;

FIG. 5 is an illustrative perspective view of the adapter of the connector assembly of FIG. 1 in another direction;

FIG. 8 is a cross section view of the connector of FIG. 2 taken in a width direction along a center line;

FIG. 9 is a cross section view of the connector of FIG. 8 taken along a line C-C;

DETAILED DESCRIPTION OF PREFERRED EMBODIMENTS OF THE INVENTION

Figure 1:
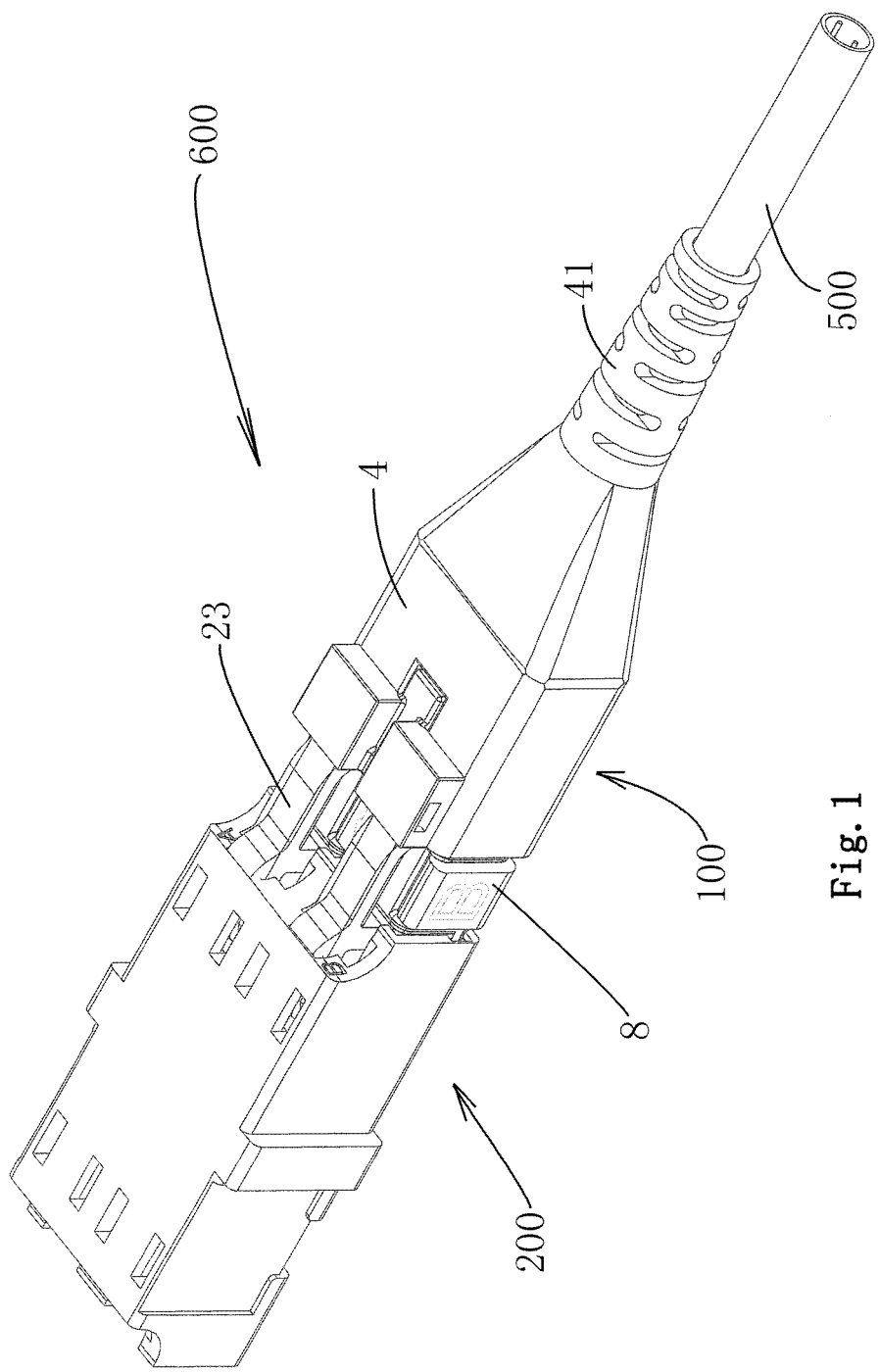
FIG. 1 is an illustrative perspective view of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

FIG. 1 is an illustrative perspective view of a connector assembly 600 according to an exemplary embodiment of the present invention. The connector assembly 600 mainly comprises an adapter 200 and a connector of the present invention. Optical fibers of two optical cables 500 can be spliced, distributed or switched with the connector assembly 600 of the present invention.

Figure 6:
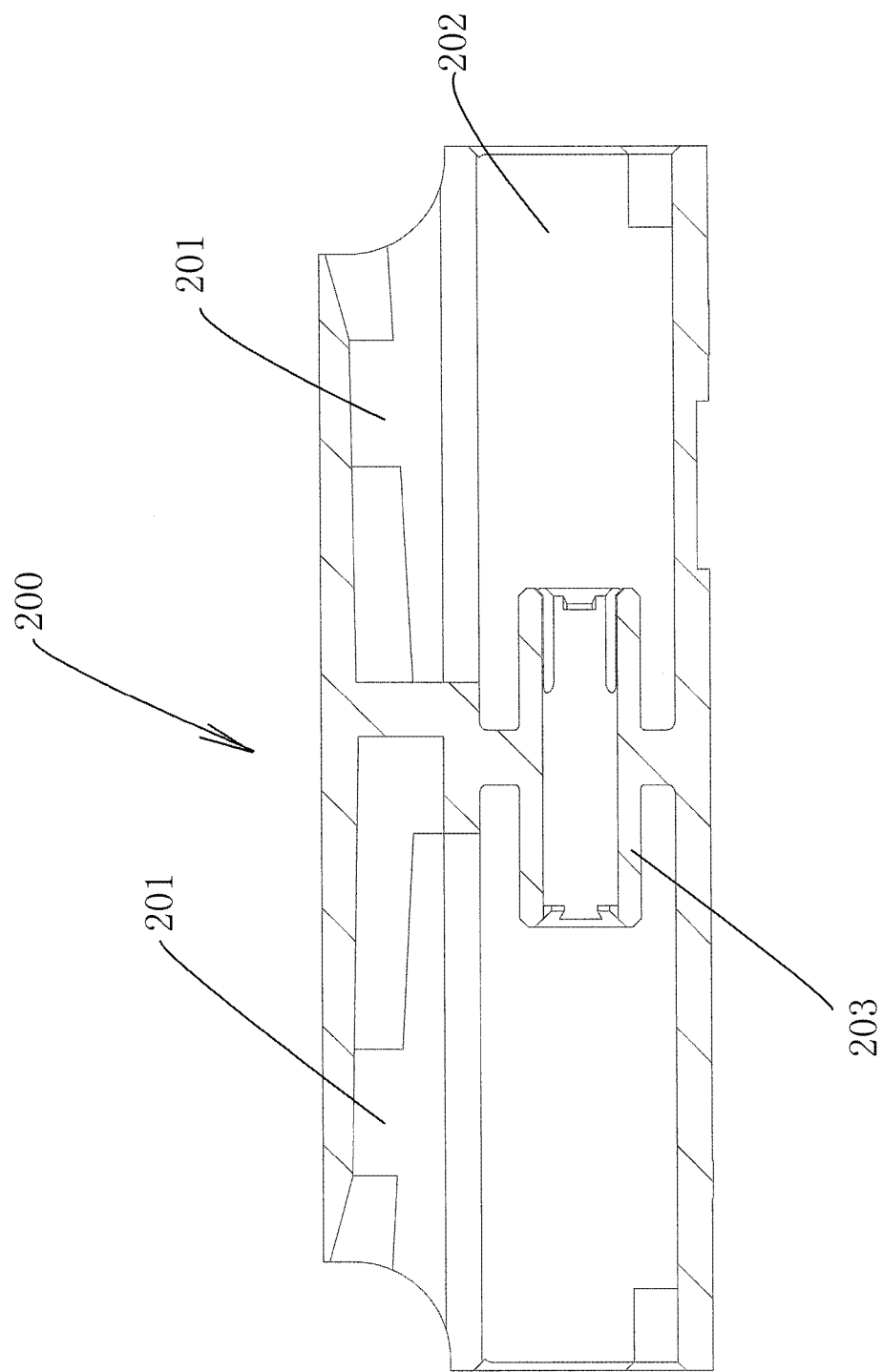
FIG. 6 is a cross section view of the adapter of FIG. 4 taken along a line A-A.

Referring to FIGS. 4-6, the adapter 200 mainly comprising: four chambers 202 in pairs formed in both ends of the adapter 200, respectively, and configured to receive inserted connector bodies therein, respectively; two locking grooves 201 formed in inner walls of any one of the chambers 202, respectively, and configured to fit with locking protrusions (described later) of the connector 100; and two splicing portions 203 each disposed between a pair of chambers 202 for coupling with an ferrule 13 of the connector body inserted into the chamber 202. In this way, the optical fibers of the two optical cables will be spliced in the splicing portions 203. It would be appreciated for those skilled in this art that the connector assembly 600 can be applied to not only splice the optical cables, but also electrically connect two electric cables. Accordingly, the cable of the present invention may be the optical cable or the electric cable.

Figure 2:
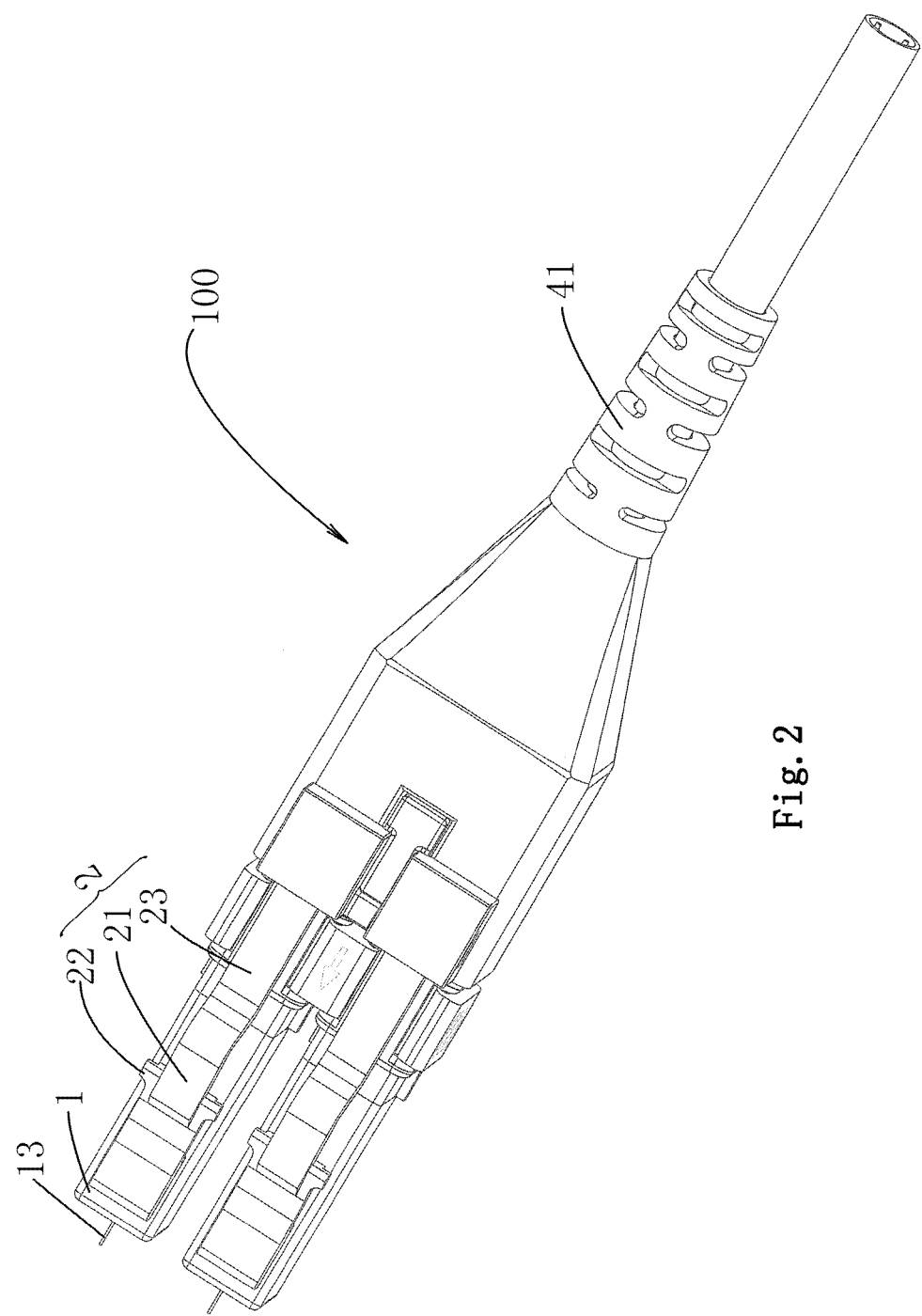
FIG. 2 is an illustrative perspective view of a connector according to an exemplary embodiment of the present invention.
Figure 3:
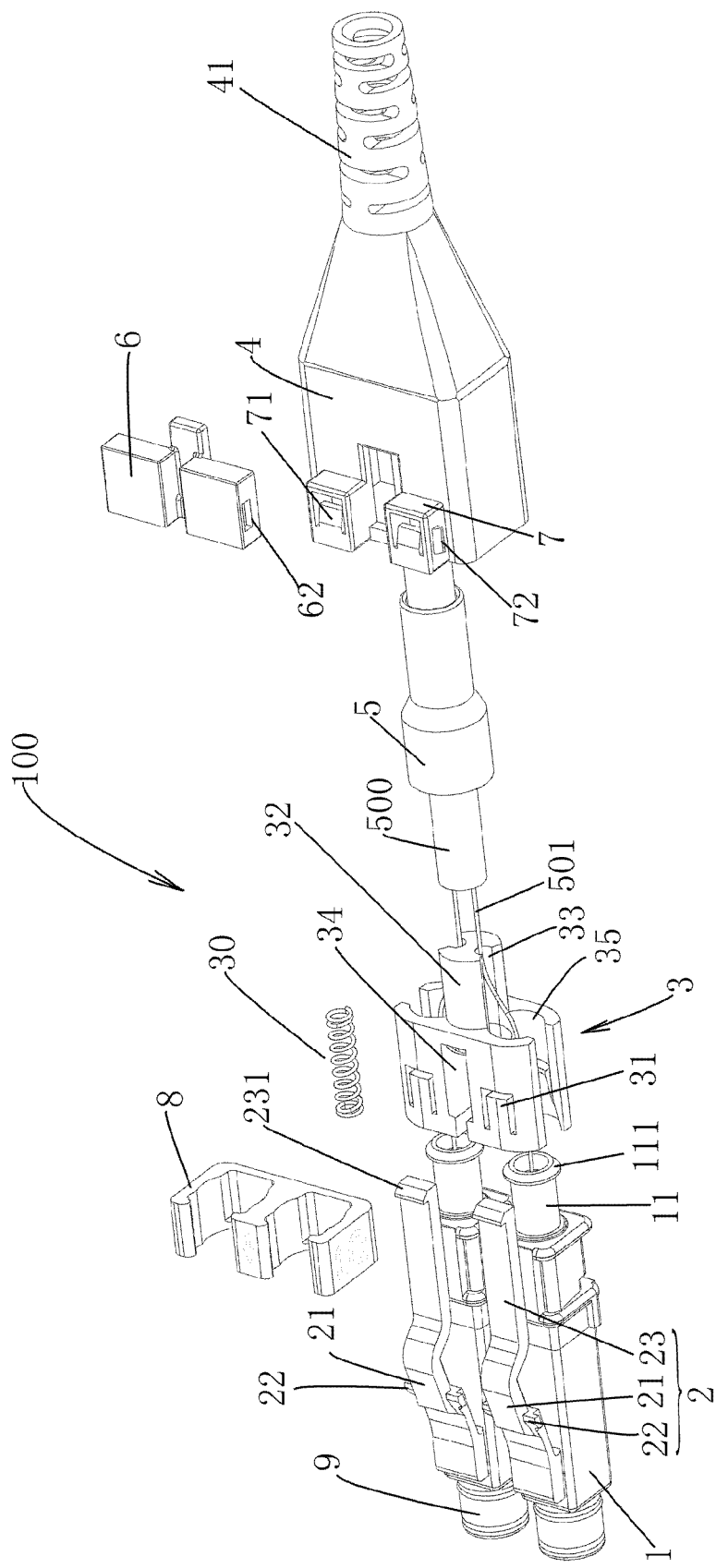
FIG. 3 is an illustrative exploded view of the connector of FIG. 2.

FIG. 2 is an illustrative perspective view of a connector 100 according to an exemplary embodiment of the present invention; FIG. 3 is an illustrative exploded view of the connector 100 of FIG. 2. The connector 100 is applied to couple with an adapter 200, and the connector 100 mainly comprising: two connector bodies 1 each having a first end capable of being inserted into the adapter 200; two locking mechanisms 2; and a boot 4 movably engaged with the connector body 1 and permitting an optical cable 500 to pass therethrough. Each of the locking mechanisms 2 mainly comprising: a slanting arm 21 extending slantingly and upwardly from the respective connector body 1; two locking protrusions 22 configured to extend from sides of the slanting arm 21 to lock the connector body 1 into the locking grooves 201 (please see FIG. 6) of the adapter 200; and a driving arm 23 having a first end connected to the slanting arm 21. A second end of the driving arm 23 is connected to the boot 4 and is movable together with the boot 4 to drive the slanting arm 21 connected with the first end of the driving arm 23 to approach a horizontal direction (an axial direction of the connector). When an angle between the slanting arm 21 and the horizontal direction becomes smaller than a predetermined angle, the locking protrusion 22 starts to be separated from the locking groove 201 of the adapter 200 so that an interlock between the connector body 1 and the adapter 200 is unlocked.

Figure 7:
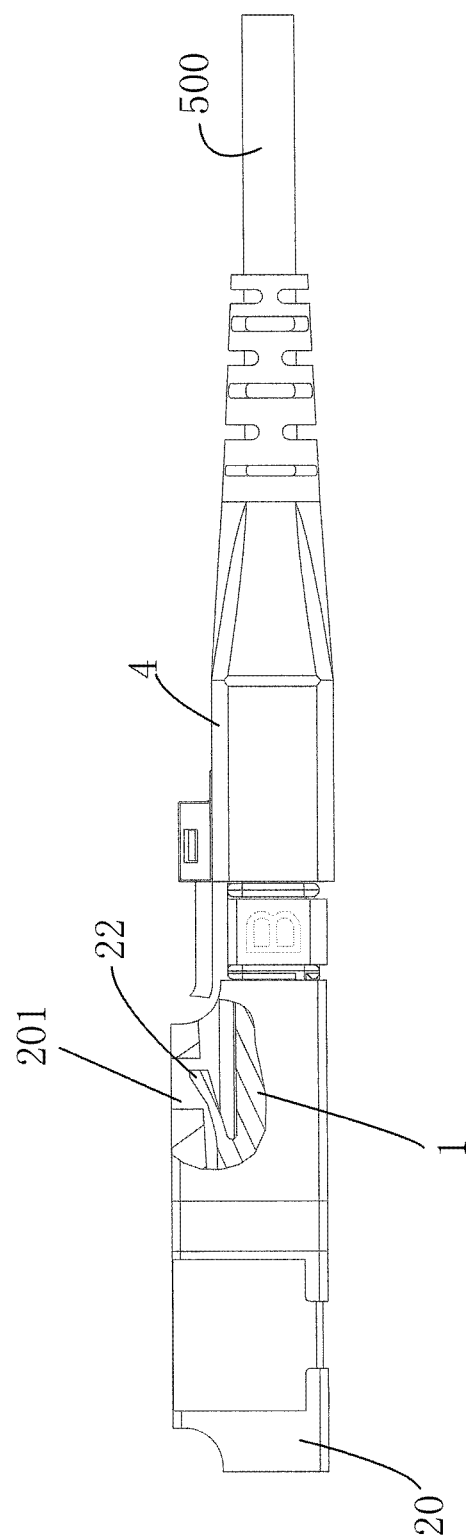
FIG. 7 is an illustrative flat view of the connector assembly of FIG. 1, wherein a local section view of which is shown.
Figure 11:
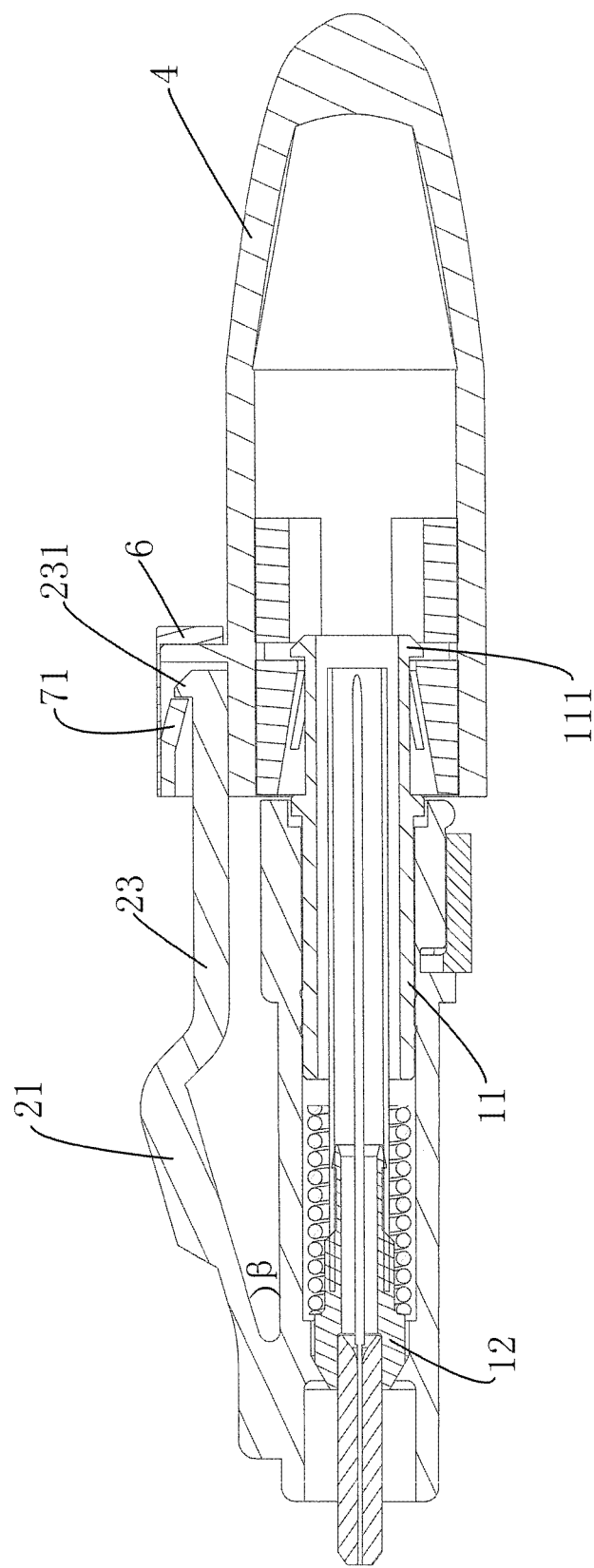
FIG. 11 is a cross section view of the connector of FIG. 8 taken along a line B-B.

In an exemplary embodiment of the present invention, the first end of the slanting arm 21 is integrally connected to an outer surface of the connector body 1, and the second end of the slanting arm 21 extends away from the outer surface of the connector body 1. In this way, as shown in FIG. 11, the slanting arm 21 extends relative to the outer surface of the connector body 1 by an angle of β to form a slope cantilever. In this way, when the boot 4 is pulled to leave away from the connector body 1, the second end of the driving arm 23 is moved together with the boot 4 to drive the second end (free end) of the slanting arm 21 to approach or displace toward the outer surface of the connector body 1. At the same time, the slanting arm 21 drives the locking protrusions 22 to approach the outer surface of the connector body 1 to separate the locking protrusions 22 from the locking grooves 201 of the adapter 200, as shown in FIG. 7. As a result, the interlock between the adapter 200 and the connector 100 is unlocked, and the connector 100 can be pulled out of the adapter 200. In the connector 100 of the present invention, during pulling the boot 4, the second end of the driving arm 23 is not separate from the boot 4, therefore, the movement distance of the boot 4 is limited by the driving arm 23. The connector is designed to ensure that the boot 4 cannot be wholly separate from the connector body 1 during the movement of the boot 4, and still ensure that the locking protrusions 22 can be completely separate from the locking grooves 201 of the adapter 200 during the movement of the boot 4.

In the connector 100 of the present invention, the interlock between the adapter 200 and the connector 100 is unlocked by pulling the boot 4 to leave away from the connector body 1, instead of pressing the slanting arm 22 above the connector 100. Accordingly, the connector 100 of the present invention greatly saves the operation space, particularly, the upper and lower space of the connector, for pressing the slanting arm 21 during plugging and pulling the connector 100. Accordingly, it permits that a plurality of adapters and/or connectors can be stacked and arranged in a highest density on the assemble panel.

The connector of the present invention further comprises an automatic restoration mechanism configured to restore the boot 4 to an initial position after an external force exerted on the boot 4 for moving the boot 4 relative to the connector body disappears. Specifically, the automatic restoration mechanism comprises a spring 30 configured to elastically deform with a movement of the boot 4 relative to the connector body 1. The automatic restoration mechanism produces a resilience force to restore the boot 4 to the initial position approach the connector body 1 when the external force disappears.

As shown in FIG. 3, the connector of the present invention further comprises an engagement device 3 for engaging the connector body 1 with the boot 4. The engagement device 3 is movably inserted into the boot 4. A second end of the connector body 1 opposite to the first end is inserted into the engagement device 3. The spring 30, as the automatic restoration mechanism, is mounted on the engagement device 3 and elastically deforms with the movement of the boot 4 relative to the engagement device 3.

Figure 10:
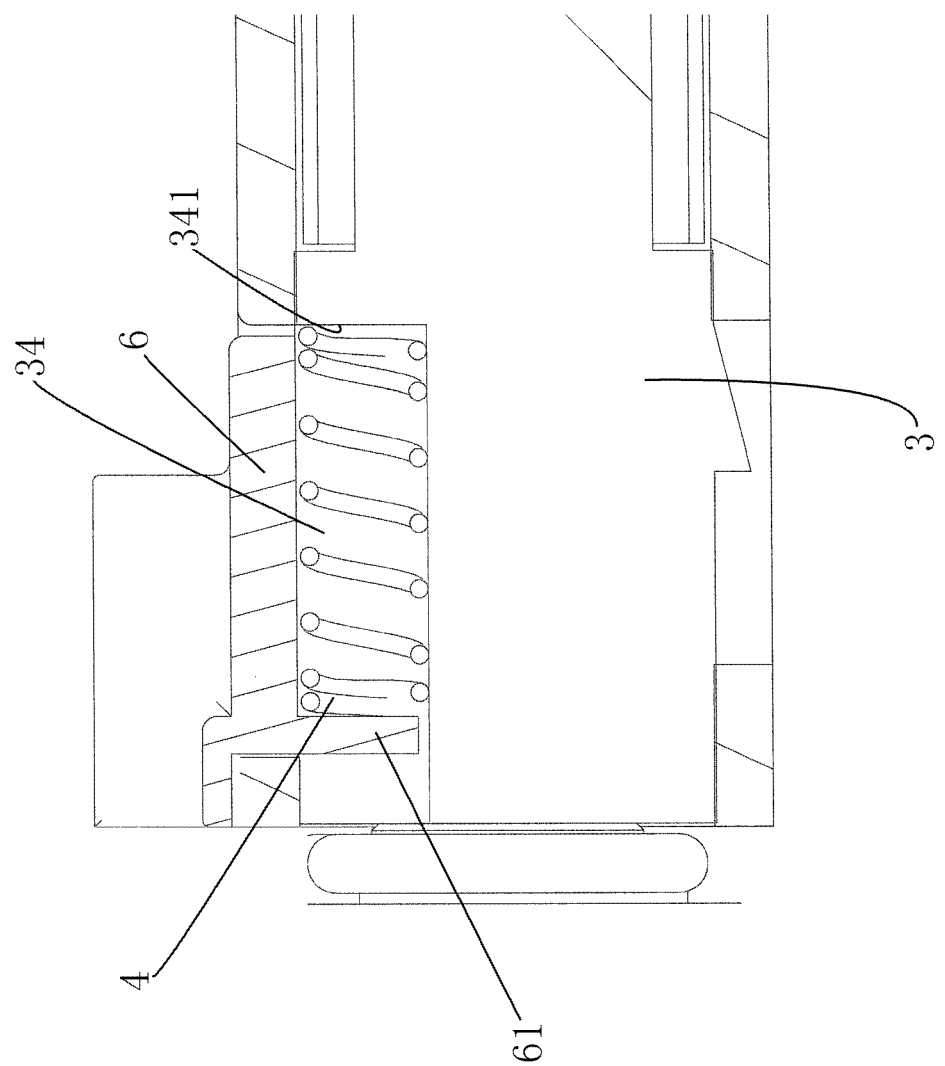
FIG. 10 is an illustrative enlarged view of a part D shown in FIG. 9.
Figure 12B:
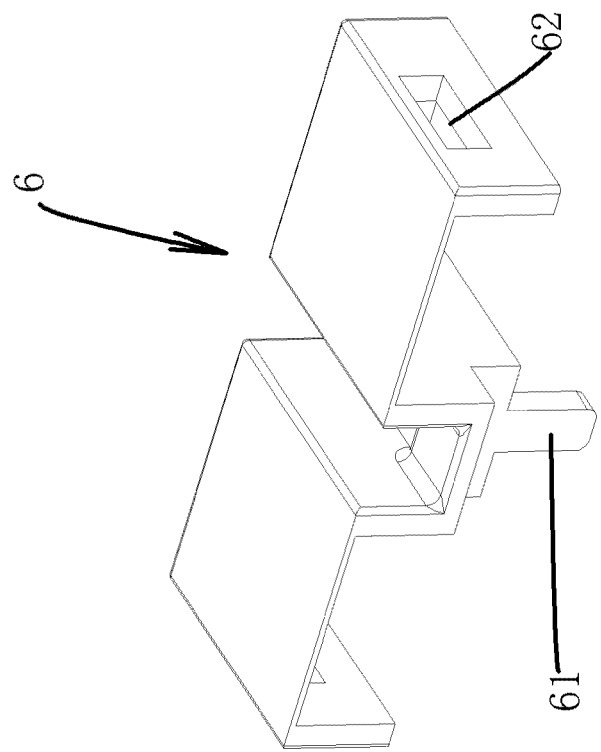
FIG. 12A and FIG. 12B show illustrative perspective views of a cover shown in FIG. 3, respectively.
Figure 12A:
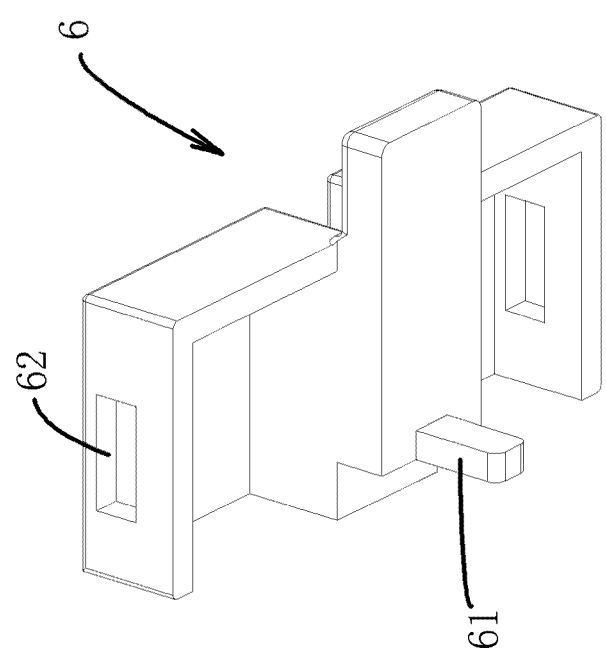

Furthermore, as shown in FIGS. 3 and 10, an elongated groove 34 for receiving the spring 30 therein is formed in an outside portion of the engagement device 3. The spring 30 is located between a block arm 61 (see FIGS. 10, 12A, 12B) inserted from the boot 4 into the elongated groove 34 and a vertical wall 341 of the elongated groove 34. The block arm 61 is stationary relative to the boot 4, and the engagement device is movable relative to the boot 4. In this way, when the engagement device is moved respect to the boot 4, the spring 30 is compressed and elastically deformed. In an alternative embodiment of the housing of the connector, a restoration spring may be directly provided on the boot 4 and connector body 1.

Referring to FIGS. 3, 9-11, in the connector according to an exemplary embodiment of the present invention, the second end of the driving arm 23 is connected to the boot 4 in a snap-in manner. Specifically, a first protuberance 231 is provided on the second end of the driving arm 23, and a fixation portion 7 for receiving the second end of the driving arm 23 is provided on an outer portion of the boot 4 and formed with a first elastic piece 71 for fitting with the first protuberance 231. After the second end of the driving arm 23 has been inserted into the fixation portion 7, the first elastic piece 71 blocks the first protuberance 231 to prevent the second end of the driving arm 23 from being separated from the fixation portion 7 during drawing the boot 4. The second end of the driving arm 23 is moved together with the boot 4 when the boot 4 is drawn. Since the driving arm 23 is much longer than the slanting arm 21, when the driving arm 23 drives the slanting arm 21 to displace toward the outer surface of the connector body 1, the first end of the driving arm 23 also displaces toward the outer surface of the connector body 1, but the driving arm 23 as a whole moves substantially parallel to the outer surface of the connector body 1.

Furthermore, as shown in FIGS. 3, 9, 10, 12A and 12B, a detachable cover 6 is provided on the fixation portion 7. The elongated groove 34 for receiving the spring 30 therein is formed in an outside portion of the engagement device 3. The cover 6 has the block arm 61 extending downward through the boot 4 and inserted into a front end of the spring 30 received in the elongated groove 34 of the engagement device 3 so that the spring 30 is abutted against the block arm 61, as a result, the spring 30 is located between the block arm 61 and the vertical wall 341 of the elongated groove 34. The block arm 61 may be formed on the cover 6, or may be directly formed on the boot 4. An opening 62 is formed in the cover 6, and a projection 72 (shown in FIG. 3) corresponding to the opening 62 is formed on the fixation portion 7 so that the cover 6 can be mounted on the fixation portion 7 in a snap-in manner.

Referring FIG. 3 and FIG. 11, the connector body 1 comprises a tubular connection portion 11 extending from the second end of the connector body 1 and inserted into the engagement device 3 in a snap-in manner to prevent the connector body 1 from being disengaged from the engagement device 3. Furthermore, the connection portion 11 is provided with a second protuberance 111 radially extending outward. The engagement device 3 is formed with a second elastic piece 31 for fitting with the second protuberance 111. When the connection portion 11 has been inserted into the engagement device 3, the second elastic piece 31 blocks the second protuberance 111 to prevent the connector body 1 from being separated from the engagement device 3. Accordingly, the engagement device 3 moves together with the connector body 1 relative to the boot 4 when the boot 4 is drawn. In the illustrative embodiments, the connector comprises two connector bodies 1, and the connector further comprises a holding bracket 8 for holding the two connector bodies side by side. That is, the two connector bodies 1 are independent from each other and arranged side by side by the holding bracket 8. Consequently, the engagement device 3 comprises two receiving spaces 35 for receiving the two connection portion 11 of the two connector bodies 1 therein. Each of the receiving spaces 35 is defined by an upper wing and a lower wing extending from a middle portion of the engagement device 3 to both sides thereof. Alternatively, the receiving space of the engagement device 3 may be formed as an enclosed cylindrical space.

Figure 13:
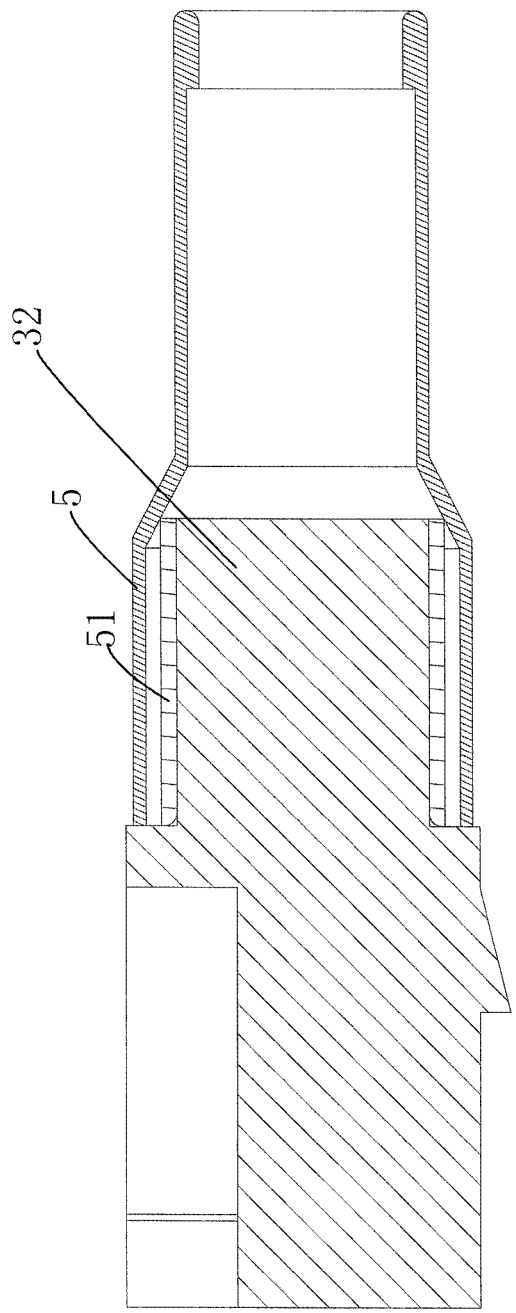
FIG. 13 is a cross section view of an extension portion of a connector body fitted in a protect sleeve according to an exemplary embodiment of the present invention.
Figure 14:
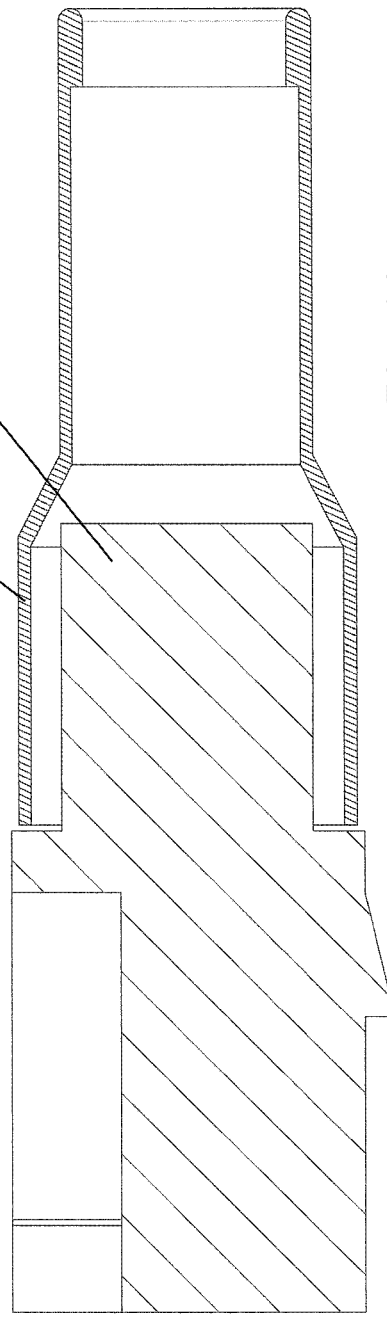
FIG. 14 is a cross section view of an extension portion of a connector body fitted in a protect sleeve according to another exemplary embodiment of the present invention.
Figure 15:
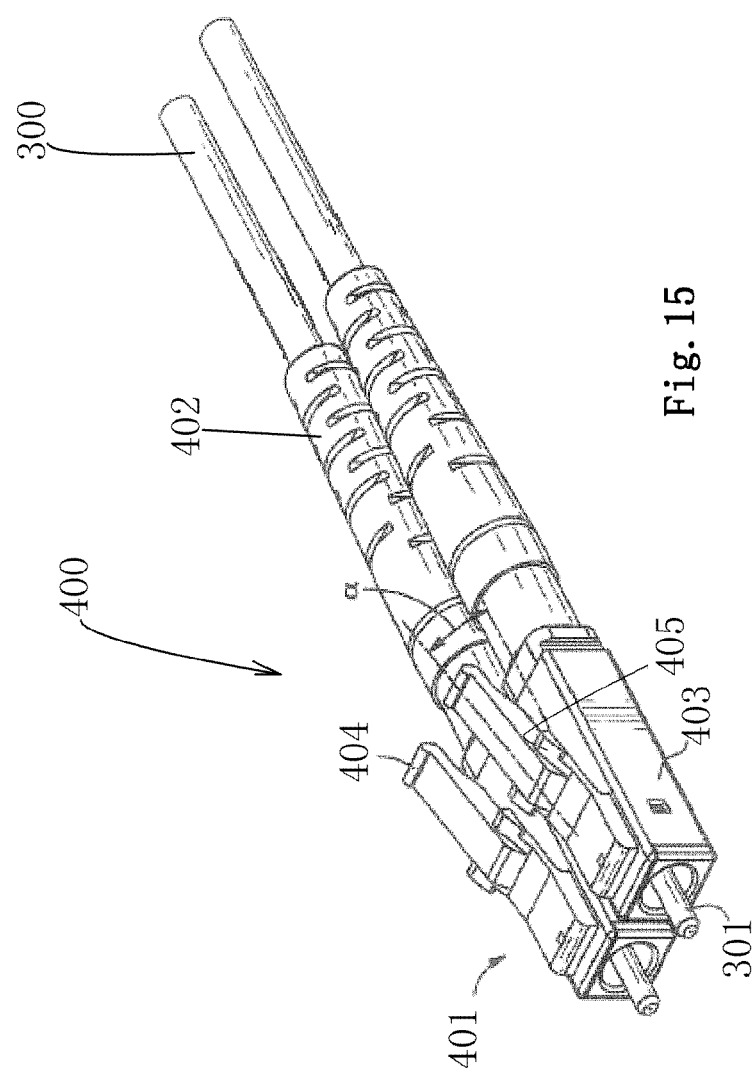
FIG. 15 is an illustrative perspective view of a conventional connector.
Figure 16:
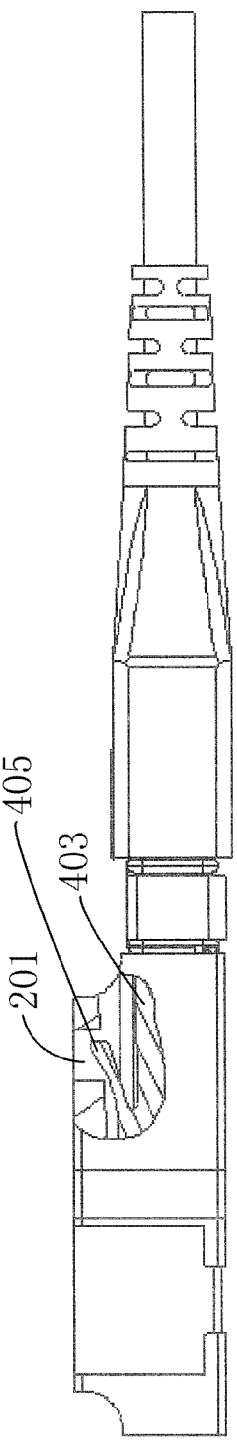
FIG. 16 is an illustrative flat view of the connector of FIG. 15, wherein a local section view of which is shown.

As shown in FIGS. 3, 13 and 14, the connector of the present invention further comprises a holding ring 5 provided in the boot 4. A cable 500 introduced in the boot 4 passes through the holding ring 5. Additionally, the engagement device 3 comprises an extension portion 32 extending from the middle portion of the engagement device 3, and the holding ring 5 can be slid to the extension portion 32 over the cable 500 to hold contact between the extension portion 32 and the protect sleeve of the cable 500 by a crimped manner. Furthermore, a receiving groove 33 for receiving a bared fiber 501 of the cable 500 is formed in the extension portion 32 so that the bared fiber 501 of the cable 500 can pass through the receiving groove 33 and enters into the connection portion 11 of the connector body 1. Furthermore, a secondary ring 51 (shown in FIG. 13) is provided between the extension portion 32 and the holding ring 5. When the holding ring 5 is crimped on the extension portion 32, the secondary ring 51 can protect the extension portion 32.

In the connector 100 of the present invention, the optical cable 500 passes through a relief boot 41 connected to the boot 4 and enters into the boot 4, then passes through the holding ring 5, and then a protection layer of the optical cable 500 is peeled off to expose the bared fiber 501. The bared fiber 501 passes through the receiving groove 33 and enters into the connector body 1 through the connection portion 11. Referring to FIGS. 8 and 11, a fiber fixation device 12 is provided in the connector body 1. The bared fiber 501 is positioned by the fiber fixation device 12 and connected to the ferrule 13. As shown in FIG. 3, a protect cover 9 is also provided on the ferrule to protect the ferrule 13.

In the present invention, the connector 100 comprises two connector bodies 1, and the connector 100 further comprises a holding bracket 8 for holding the two connector bodies side by side. In an alternative embodiment of the present invention, the connector may have only one connector body to omit the bracket. In addition, the engagement device 3 and the boot 4 may be configured to have a cylindrical structure, and such connector only can splice one bared fiber. In another alternative embodiment of the present invention, the connector may comprise three or more connector bodies.

In the above embodiments of the present invention, it has been described a connector assembly in which the connector 100 inserted into an adapter 200 having chambers 202 in both ends thereof. In an alternative embodiment of the present invention, the connector assembly may comprises the connector 100 according to the above embodiments, and an adapter 200 comprising: at least one chamber 202 formed in one end of the adapter and configured to receive the respective inserted connector body therein; at least one locking groove 201 formed in an inner wall of the chamber 202 and configured to fit with the locking protrusion of the connector; and at least one splicing portion 203 each disposed in the respective chamber and provided with a fixation ferrule for coupling with the ferrule 13 of the connector body inserted into the chamber. In this embodiment, the chambers are formed only in one end of the adapter, and a fixation ferrule is pre-embedded in the splicing portion. Such connector may be pre-mounted on, for example, a wall or a bracket, and function as a receptacle connector for fitting with the plug connector of the present invention.

According to various exemplary embodiments of the present invention, the interlock between the connector and an adapter can be released by directly moving boot relative to the connector body, therefore, the operator does not need to press the elastic slanting arm with fingers and then pull the connector out of the adapter. Furthermore, the automatic restoration mechanism can automatically restore the boot to the initial position after the external force exerted on the boot for moving it relative to the connector body disappears. Moreover, the connector of the present invention can greatly reduce the operation space for plugging and pulling the connector, as a result, a plurality of adapters and/or connectors can be arranged and mounted on the assemble panel in a higher density.

Although it has been described the connector of the present invention by an example of an optical cable connector, it would be appreciated by those skilled in the art that the connector of the present invention may be an electric cable connector for connecting two electric cables, for example, a plug connector or a receptacle connector of various network communication terminals, such as a computer, a router, a server, a exchanger, etc. The plug connector may be provided with the locking mechanism consisting of a slanting arm, a driving arm and locking protrusions of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector for coupling with an adapter, comprising:
   at least one connector body each having a first end capable of being inserted into the adapter;
   at least one locking mechanism each comprising:
   a slanting arm extending slantingly and upwardly from the respective connector body;
   at least one locking protrusion configured to extend from sides of the slanting arm to lock the connector body into locking grooves of the adapter;
   a driving arm having a first end connected to the slanting arm; and
   a boot movably engaged with the connector body,
   wherein a second end of the driving arm is connected to the boot and is movable together with the boot to drive the slanting arm connected with the first end of the driving arm to approach a horizontal direction,
   when an angle between the slanting arm and the horizontal direction becomes smaller than a predetermined angle, the locking protrusion starts to be separated from the locking groove of the adapter, so that an interlock between the connector body and the adapter is unlocked; and further comprising:
   an automatic restoration mechanism configured to restore the boot to an initial position, approaching the connector body, after an external force exerted on the boot for moving it relative to the connector body disappears; and
   an engagement device movably inserted into the boot, wherein a second end of the connector body opposite to the first end is inserted into the engagement device, and wherein the automatic restoration mechanism is mounted on the engagement device and generates elastic deform with a movement of the boot relative to the engagement device.

2. The connector according to claim 1, wherein the automatic restoration mechanism comprises a spring configured to elastically deform with a movement of the boot relative to the connector body so as to produce a resilience force for restoring the boot to the initial position when the external force disappears.

3. The connector according to claim 2, wherein an elongated groove for receiving the spring therein is formed in an outside portion of the engagement device.

4. The connector according to claim 3, wherein the second end of the driving arm is connected to the boot in a snap-in manner.

5. The connector according to claim 4, wherein a first protuberance is provided on the second end of the driving arm, and
   wherein a fixation portion for receiving the second end of the driving arm is provided on an outer portion of the boot and formed with a first elastic piece for fitting with the first protuberance.

6. The connector according to claim 5, wherein a detachable cover is provided on the fixation portion and has a block arm extending downward and inserted into a front end of the spring received in the elongated groove of the engagement device so that the spring is abutted against the block arm.

7. The connector according to claim 1, wherein the connector body comprises a connection portion extending from the second end of the connector body and inserted into the engagement device in a snap-in manner to prevent the connector body from being disengaged from the engagement device.

8. The connector according to claim 7, wherein the connection portion is provided with a second protuberance radially extending outward,
   wherein the engagement device is formed with a second elastic piece for fitting with the second protuberance, and
   wherein the connector body and the engagement device are fixed together by a snap-in manner of the second protuberance and the second elastic piece.

9. The connector according to claim 1, further comprising a holding ring provided in the boot, a cable introduced in the boot passing through the holding ring,
   wherein the engagement device comprises an extension portion, and the holding ring can be slid to the extension portion over the cable.

10. The connector according to claim 9, wherein a receiving groove for receiving a bared fiber of the cable is formed in the extension portion.

11. The connector according to claim 10, wherein a secondary ring is provided between the extension portion and the holding ring.

12. The connector according to claim 7, wherein the connector comprises two connector bodies, and a holding bracket is provided to hold the two connector bodies side by side.

13. The connector according to claim 1, wherein the connector is a fiber optic connector.

14. The connector according to claim 13, wherein the connector is a LC type of fiber optic connector.

15. A connector assembly comprising:
   a connector, comprising:
   at least one connector body each having a first end capable of being inserted into the adapter;
   at least one locking mechanism each comprising:
   a slanting arm extending slantingly and upwardly from the respective connector body;

at least one locking protrusion configured to extend from sides of the slanting arm to lock the connector body into locking grooves of the adapter;

a driving arm having a first end connected to the slanting arm; and a boot movably engaged with the connector body;

wherein a second end of the driving arm is connected to the boot and is movable together with the boot to drive the slanting arm connected with the first end of the driving arm to approach a horizontal direction;

when an angle between the slanting arm and the horizontal direction becomes smaller than a predetermined angle, the locking protrusion starts to be separated from the locking groove of the adapter, so that an interlock between the connector body and the adapter is unlocked; and further comprising:

an automatic restoration mechanism configured to restore the boot to an initial position, approaching the connector body, after an external force exerted on the boot for moving it relative to the connector body disappears; and an engagement device movably inserted into the boot, wherein a second end of the connector body opposite to the first end is inserted into the engagement device, and wherein the automatic restoration mechanism is mounted on the engagement device and generates elastic deform with a movement of the boot relative to the engagement device; and an adapter, comprising:

at least two chambers in pairs formed in both ends of the adapter, respectively, and configured to receive the inserted connector bodies therein, respectively;

at least two locking grooves formed in inner walls of the chambers, respectively, and configured to fit with the locking protrusions of the connector; and at least one splicing portion each disposed between a pair of chambers for coupling with an ferrule of the connector body inserted into the chambers.

16. A connector assembly comprising:

a connector, comprising:

at least one connector body each having a first end capable of being inserted into the adapter;

at least one locking mechanism each comprising:

a slanting arm extending slantingly and upwardly from the respective connector body;

at least one locking protrusion configured to extend from sides of the slanting arm to lock the connector body into locking grooves of the adapter, a driving arm having a first end connected to the slanting arm; and a boot movably engaged with the connector body;

wherein a second end of the driving arm is connected to the boot and is movable together with the boot to drive the slanting arm connected with the first end of the driving arm to approach a horizontal direction;

when an angle between the slanting arm and the horizontal direction becomes smaller than a predetermined angle, the locking protrusion starts to be separated from the locking groove of the adapter, so that an interlock between the connector body and the adapter is unlocked; and further comprising:

an automatic restoration mechanism configured to restore the boot to an initial position, approaching the connector body, after an external force exerted on the boot for moving it relative to the connector body disappears; and an engagement device movably inserted into the boot, wherein a second end of the connector body opposite to the first end is inserted into the engagement device, and wherein the automatic restoration mechanism is mounted on the engagement device and generates elastic deform with a movement of the boot relative to the engagement device; and an adapter, comprising:

at least one chamber formed in one end of the adapter and configured to receive the respective inserted connector body therein;

at least one locking groove formed in an inner wall of the chamber and configured to fit with the locking protrusion of the connector; and at least one splicing portion each disposed in the respective chamber and provided with a fixation ferrule for coupling with an ferrule of the connector body inserted into the chamber.

* * * * *

UNITED STATES PATENT AND TRADEMARK OFFICE
CERTIFICATE OF CORRECTION

PATENT NO. : 9,448,370 B2  
APPLICATION NO. : 14/379909  
DATED : September 20, 2016  
INVENTOR(S) : Xue et al.

Page 1 of 1

It is certified that error appears in the above-identified patent and that said Letters Patent is hereby corrected as shown below:

In the Claims

Column 11, Line 38, Claim 15: "coupling with an ferrule" should read --coupling with a ferrule--

Column 12, Line 41, Claim 16: "coupling with an ferrule" should read --coupling with a ferrule--

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*